US010809789B1

(12) United States Patent
Lambert et al.

(10) Patent No.: US 10,809,789 B1
(45) Date of Patent: Oct. 20, 2020

(54) PERIPHERAL COMPONENT PROTECTION IN INFORMATION HANDLING SYSTEMS

(71) Applicant: Dell Products L.P., Round Rock, TX (US)

(72) Inventors: Timothy M. Lambert, Austin, TX (US); Jeffrey Leighton Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/514,023

(22) Filed: Jul. 17, 2019

(51) Int. Cl.
*G06F 1/3215* (2019.01)
*G06F 13/10* (2006.01)

(52) U.S. Cl.
CPC .......... *G06F 1/3215* (2013.01); *G06F 13/102* (2013.01)

(58) Field of Classification Search
None
See application file for complete search history.

(56) References Cited

U.S. PATENT DOCUMENTS

| 5,347,150 | A | * | 9/1994 | Sakai | H01L 27/0218 257/203 |
| 5,987,260 | A | * | 11/1999 | Arnold | G06F 13/385 710/62 |
| 10,387,346 | B2 | * | 8/2019 | Ni | G06F 13/4282 |
| 2007/0238349 | A1 | * | 10/2007 | Barnette | G06F 13/4072 439/500 |
| 2007/0239963 | A1 | * | 10/2007 | Yao | G06F 15/17 712/11 |
| 2009/0199022 | A1 | * | 8/2009 | Fukuda | G06F 1/3203 713/300 |
| 2013/0154389 | A1 | * | 6/2013 | Kurs | B60L 3/0069 307/104 |
| 2017/0315956 | A1 | * | 11/2017 | Choi | G06F 1/266 |

* cited by examiner

Primary Examiner — Farley Abad
Assistant Examiner — Dayton Lewis-Taylor
(74) Attorney, Agent, or Firm — Norton Rose Fulbright US LLP (57) ABSTRACT

Logic on the baseboard can be used to provide backfeed protection by determining the condition of the peripheral component before enabling communication over a data cable to the peripheral component. By determining the condition of the peripheral component prior to beginning communications, the baseboard can reduce the likelihood that the baseboard asserts a wire on the data cable before the peripheral component receives power. With such information available to the baseboard, the baseboard avoids supplying a data signal over a wire of the data cable that would cause the destination circuitry of the peripheral component from exceeding its safety specification. When a bias voltage exists on the wire of the data connector corresponding to the peripheral component, the peripheral component is considered powered-on and data can be communicated to the peripheral component. Communications with that peripheral component may be enabled by turning on a clock source to provide a clock signal through the data connector to the peripheral component. The clock signal is then used by the peripheral components to decode data transmitted on the data cable.

20 Claims, 5 Drawing Sheets

PERIPHERAL COMPONENT PROTECTION IN INFORMATION HANDLING SYSTEMS

FIELD OF THE DISCLOSURE

The instant disclosure relates to information handling systems. More specifically, portions of this disclosure relate to protection circuitry for peripheral components in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
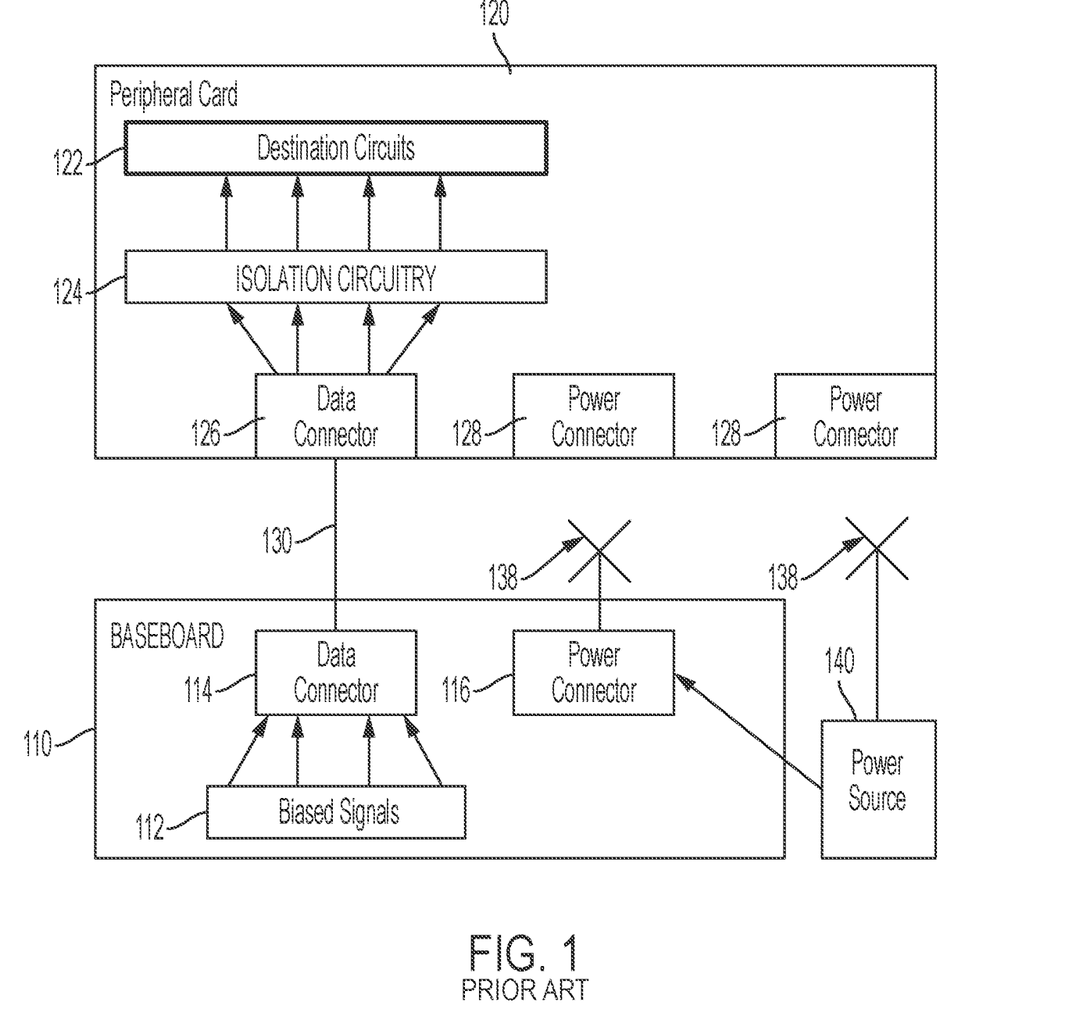
FIG. 1 shows a block diagram of an information handling system with isolation circuitry for protection of a peripheral component.

Some of the hardware components in the information handling system may be contained on peripheral components that are separate from the CPU, memory, and other logic circuitry on a baseboard of the information handling system as shown in FIG. 1. FIG. 1 shows a block diagram of an information handling system with isolation circuitry for protection of a peripheral component. A peripheral component 120 may include destination circuits 122 that receive and process data from baseboard 110 over data cable 130. The data cable 130 connects the peripheral component 120 to the baseboard 110 through a data connector 114 on the baseboard 110 and a data connector 126 on the peripheral component 120. The peripheral component 120 is powered by a power source 140 shared by the baseboard 110. Power is received through power connectors 128 to a power connector 116 on the baseboard 110 or directly to the power source 140. Isolation circuitry 124 is positioned between the destination circuits 122 and the data connector 126 to prevent an error condition illustrated in FIG. 1. In FIG. 1, the power connection between the peripheral component 120 and the power source 140 has failed at point 138, such as by the cable breaking or by incorrect installation of the peripheral component 120. As a result of the failed power connection, there is no power supply for the peripheral component 120 and no supply voltage provided to the destination circuits 122. An error may occur if wires in the data cable 130 are asserted by the baseboard 110 driving biased signals 112 onto the wires without the presence of the isolation circuitry 124 while the power source 140 is disconnected from destination circuits 122. This is because the destination circuits 122 have safety specification, and those safety specifications are exceeded when the supply voltage for the destination circuits 122 exceeds an input voltage. That supply voltage at the destination circuits 122 is zero while power source 140 is disconnected, during which time the rated safety specifications of the destination circuits 122 is exceeded with the input voltage being higher than the supply voltage.

The isolation circuitry 124 operate to protect the destination circuits 122 from this out-of-bound condition that may exist when the power source 140 is disconnected from the peripheral component 120. The isolation circuitry 124 prevents the input voltage received over the data cable 130 at the data connector 126 from being applied to the destination circuits 122 while the power connector 128 is disconnected from the power source 140. In this manner, the destination circuits 122 are protected by being isolated from the data connector 126. However, the isolation circuitry 124 consumes space on the peripheral component 120, increases the cost of the peripheral component 120, and/or can degrade the signal quality of the data received over the data cable 130 at the data connector 126. This isolation circuitry 124 is, however, needed in this example scenario because the baseboard 110 cannot determine the status of the peripheral component 120 prior to sending communications over the data cable 130.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

The need for isolation circuitry on the peripheral component is reduced or eliminated by implementing logic on the baseboard to determine the condition of the peripheral component before enabling communication over a data cable to the peripheral component. By determining the condition of the peripheral component prior to beginning communications, the baseboard can reduce the likelihood that the baseboard asserts a wire on the data cable before the peripheral component receives power. With such information available to the baseboard, the baseboard avoids supplying a data signal over a wire of the data cable that would cause the destination circuitry of the peripheral component from exceeding its safety specification. When a bias voltage exists on the wire of the data connector corresponding to the peripheral component, the peripheral component is considered powered-on and data can be communicated to the peripheral component. Communications with that peripheral component may be enabled by turning on a clock source to provide a clock signal through the data connector to the peripheral component. The clock signal is then used by the peripheral components to decode data transmitted on the data cable.

In some embodiments, the detection of the powered-on peripheral component begins with the baseboard circuitry applying a weak pull-down to a wire of the data connector to the peripheral component. The baseboard circuitry then monitors this wire of the data connector. The baseboard detects when a strong pull-up is detected on that wire that overrides the baseboard's weak pull-down. The peripheral component is considered to be ready for communication when a bias voltage is detected on the wire of the data connector. After the peripheral component receives power, is detected by the baseboard, and its corresponding clock signal enabled, the baseboard may begin sending data over the data connector to the peripheral component.

The algorithm may be implemented by components on a baseboard of the information handling system, including a complex programmable logical device (CPLD), such as a field-programmable logic device (FPGA), and a baseboard management controller (BMC). For example, the CPLD may sample signals to detect a bias on a data connector to determine local power exists on a peripheral component attached to the data connector. Information regarding the bias state may be conveyed to the BMC, which uses the information in an algorithm to determine what peripheral components are not accounted for biasing detected across data connectors of the information handling system. The BMC may traverse information regarding a known configuration for the information handling system and determine powered and unpowered peripheral components. The baseboard may determine a configuration of an information handling system to generate a listing of peripheral components during a power-on cycle or other time during operation of the information handling system by polling the peripheral components. If a peripheral component is known as connected to a data connector but is not being reported as part of a powered peripheral component inventory, then the BMC may instruct the CPLD to disable the peripheral component or group of peripheral components containing the peripheral component or keep system from powering on. If the BMC determines that a group of signals for a data connector are ready to initialize, the BMC provides such information to the CPLD, which can then enable appropriate clock sources. In some embodiments, the BMC may prevent the information handling system from powering on until all peripheral components are accounted for. For example, the power-on self-test (POST) routine may be prevented from completing until peripheral components are verified as powered. In some embodiments, the protection functionality may be integrated into a single integrated circuit (IC) controller.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 2A:
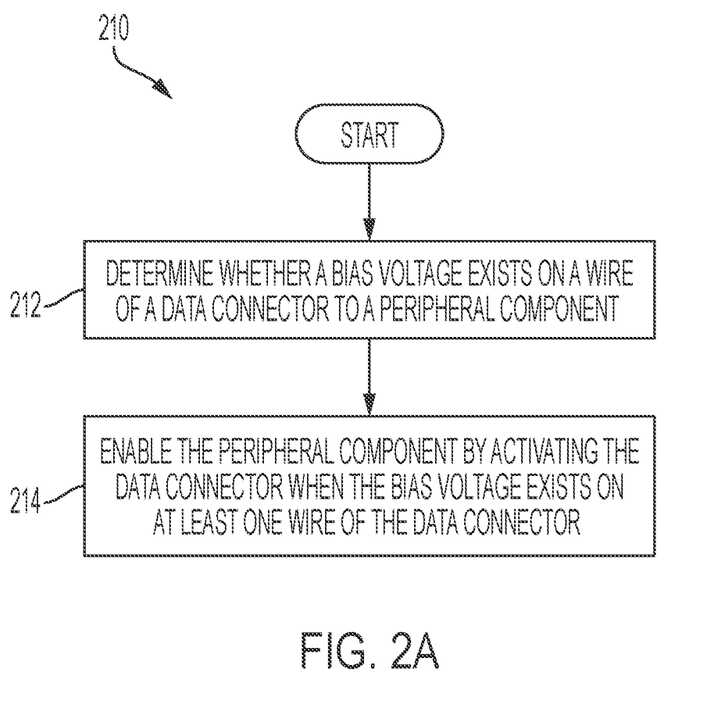
FIG. 2A is a flow chart illustrating a method for interfacing with peripheral components by an information handling systems according to embodiments of the disclosure.

The information handling system may be configured to protect peripheral components of the information handling system with logic on the baseboard. The logic on the baseboard may be configured to perform the protection method shown in FIG. 2A. FIG. 2A is a flow chart illustrating a method for interfacing with peripheral components by an information handling systems according to embodiments of the disclosure. A method 210 begins at block 212 with determining whether a bias voltage exists on a wire of a data connector to the peripheral component. Then, at block 214, communication with the peripheral component is enabled when the bias voltage is determined to exist. One manner of enabling the peripheral component at block 214 is activating a clock signal for the data connector to the peripheral component.

Figure 2B:
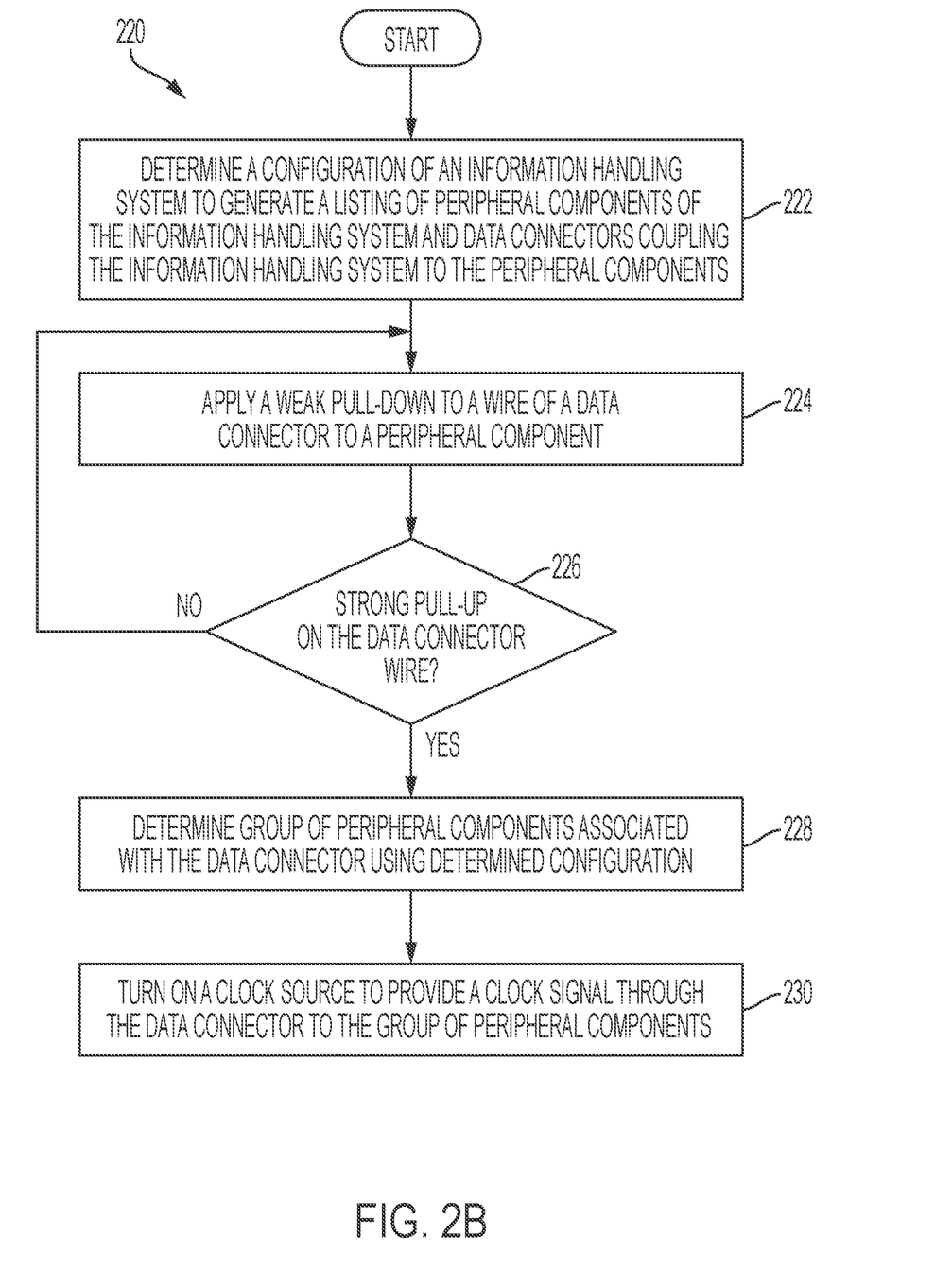
FIG. 2B is a flow chart illustrating a method for interfacing with peripheral components by activating a clock signal in an information handling system according to embodiments of the disclosure.

FIG. 2B is a flow chart illustrating a method for interfacing with peripheral components by activating a clock signal in an information handling system according to embodiments of the disclosure. A method 220 begins at block 222 with determining a configuration of the information handling system. The configuration may be determined by generating a listing of peripheral components and data connectors connecting the peripheral components to the information handling system. The configuration determination at block 222 may be performed each time a computer starts up, a chassis is opened, and/or based on other criteria. The configuration may be stored in a non-volatile storage, such as a non-volatile random access memory (NVRAM), available to one or more baseboard components. After the information handling system powers on and has a configuration stored at block 222, the method 200 continues to block 224. At block 224, a weak pull-down may be applied to a wire of a data connector that couples to one or more peripheral components. In some embodiments, the weak pull-down may be applied to one wire on each of the data connectors of the information handling system. At block 226, the wire is checked for the presence of a bias signal, such as whether a strong pull-up is applied to the wire. If no pull-up is determined at block 226, the method 220 returns to block 224 to continue applying a weak pull-down to the wire. The method 220 continues to loop blocks 224 to apply a weak pull-down and block 226 to determine if a strong pull-up is applied to determine when the peripheral component receives power supply. Pull-up and pull-down describe a known electrical engineering technique of coupling a wire to a fixed voltage through a resistor. In the case of a pull-up, a supply voltage may be applied to the wire through a resistor. In the case of a pull-down, a ground may be applied to the wire through a resistor.

When a bias voltage is detected from the strong pull-up at block 226 the peripheral component is determined to be powered and ready for safe communication over the data connector. At block 228, the information handling system determines a group of peripheral components associated with the data connector having the wire that exhibits the bias voltage. The group of peripheral components may be determined by consulting the configuration established at block 222, which maps peripheral components to data connectors. All of the peripheral components attached to the data connector may be determined to have received power and determined to be ready for communication. At block 230, a clock source is turned on to provide a clock signal through the data connector to the group of peripheral components determined at block 228. When the clock signal is enabled, communications with the peripheral component can be performed with reference to the clock signal to allow synchronization of signals on the wires between the information handling system and the peripheral component. When multiple data connectors exist on an information handling system, the blocks 226, 228, and 230 may be repeated for each of the data connectors such that individual peripheral components or groups of peripheral components are enabled as those peripheral components are ready.

Figure 3:
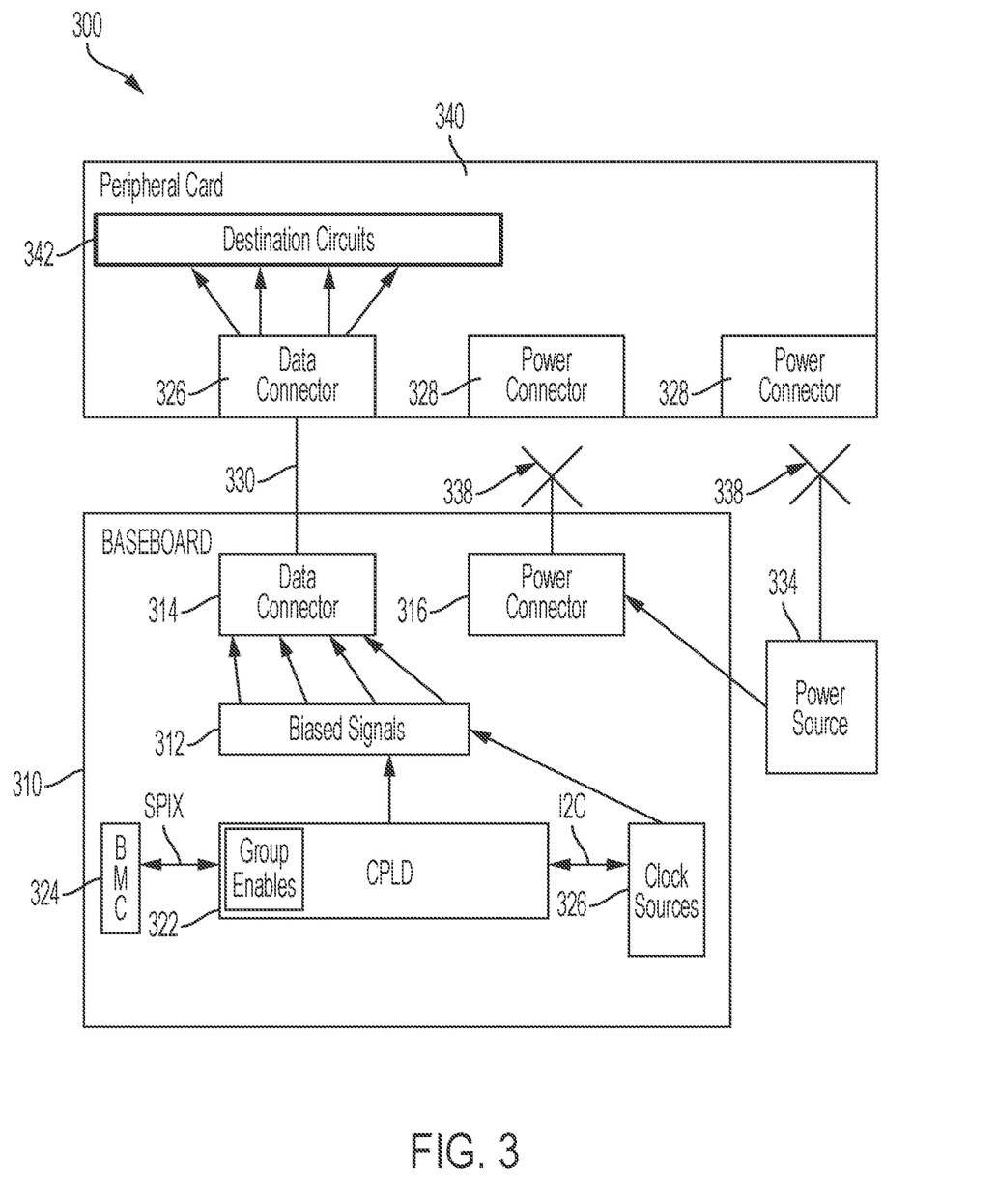
FIG. 3 is a block diagram illustrating an information handling system that interfaces with a peripheral component according to some embodiments of this disclosure.
Figure 4:
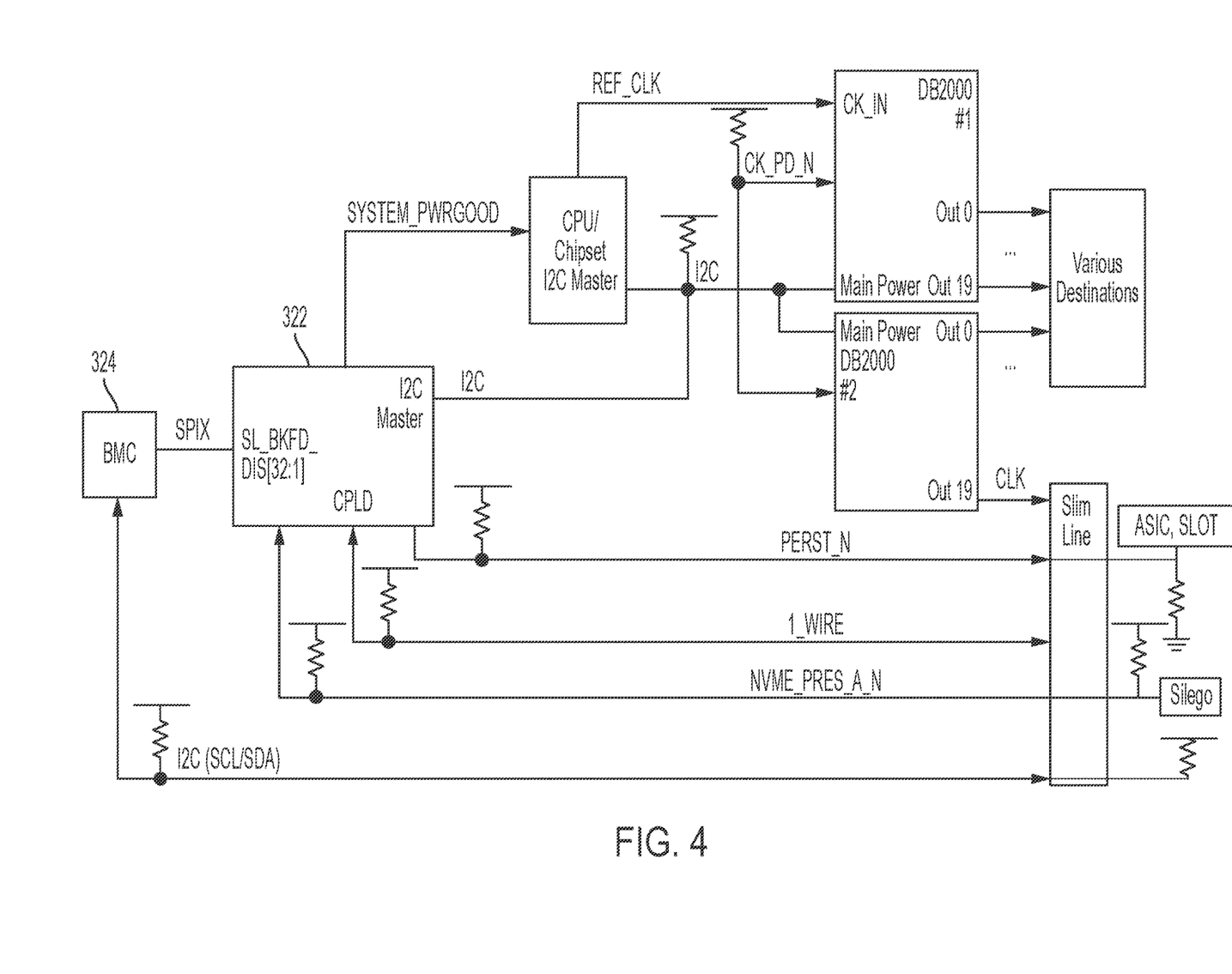
FIG. 4 is a block diagram illustrating circuitry and wire connections in an information handling system for interfacing with a peripheral component according to some embodiments of the disclosure.

Methods described with reference to FIG. 2A and FIG. 2B, along with other methods, may be implemented on an information handling system without the need of isolation circuitry on the peripheral components. Example block diagrams for implementing protection for peripheral components are shown in FIG. 3 and FIG. 4. FIG. 3 is a block diagram illustrating an information handling system that interfaces with a peripheral component according to some embodiments of this disclosure. In information handling system 300, a baseboard 310 is connected to a peripheral component, such as a card, by data cable 330. The data cable 330 is connected to a data connector 314 of the baseboard 310 and a data connector 326 of the peripheral component 340. The peripheral component 340 may be powered by a power source 334 shared with the baseboard 310. Power may be received at the peripheral component 340 through power connector 328 to either a power connector 316 of the baseboard 310 or directly to power source 334. The peripheral component 340 may include destination circuits 342, directly coupled to the data connector 326 and the data cable 330 without any isolation circuitry between the baseboard 310 and the peripheral component 340. The destination circuits 342 may be prevented from exceeding safety specifications for the circuits 342 because the input voltage to the destination circuits 342 is zero volts, or not asserted by the baseboard 310, until the destination circuits 342 are determined by the baseboard 310 to be receiving power.

This configuration and manner of operation prevents or reduces the likelihood that the input voltage Vin to any of the destination circuits 342 exceeds a supply voltage Vss to any of the destination circuits 342. An example shown in FIG. 3 illustrates a disconnect 338 of the peripheral component 340 from the power source 334. Thus, the supply voltage on the peripheral component 340 is zero volts during operation shown in FIG. 3. If data or clocks are provided over the data cable 330 to the peripheral component 340 during the disconnect, then the input voltage Vin applied to the destination circuits 342 exceeds the supply voltage Vss of the peripheral component 340. The baseboard 310 thus includes functionality to prevent the application of an input voltage to the peripheral component 340 through the data cable 330 while the supply voltage on the peripheral component 340 is zero.

The baseboard may implement such functionality according to different techniques in different embodiments of the invention. One embodiment for the implementation of such functionality in logic circuitry is shown in the baseboard 310 in FIG. 3. The baseboard 310 may include a Complex Programmable Logic Device (CPLD) 322 configured with hardware, firmware, and/or software to implement the functionality for preventing application of an input voltage to the peripheral component 340 exceeding the supply voltage on the peripheral component 340. The CPLD 322 may be coupled to a BMC 324, such as over a SPIX bus, and to clock sources 326, such as through an I2C bus. The CPLD 322 controls the generation of biased signals 312 for output to the data cable 330 through the data connector 314, such as by controlling the clock sources 326 through the I2C bus.

A detailed view of one embodiment for implementing the baseboard circuit is shown in FIG. 4. FIG. 4 is a block diagram illustrating circuitry and wire connections in an information handling system for interfacing with a peripheral component according to some embodiments of the disclosure. The circuitry of FIG. 4 includes circuitry configured to perform functions related to the protection of the peripheral components. For example, the CPLD may issue commands over the I2C bus to tristate wires to destination circuits and to turn off corresponding clock sources until corresponding peripheral components are enabled for communication. When ready for communication, the CPLD unblocks applicable signaling through the I2C bus corresponding to groups identified by the BMC to allow communication with certain destination circuits. In some embodiments, the BMC may include firmware for preventing power-on of the information handling system until all peripheral components are confirmed as powered on. In some embodiments, the information handling system may turn on regardless of peripheral component status and the BMC firmware may instruct the CPLD which connectors to enable for communication.

In the embodiment of FIG. 4, the CPLD is shown coupled by three wires to a data connector (e.g., a slim line connector). A PERST_N (e.g., PCIe Reset) de-asserts when the information handling system's chipset-associated PERST_N de-asserts. Whether this is driven open-drain or push-pull, the result is that a logical high is observed at the receiver. If the receiver peripheral component is not powered (e.g., Vcc=0 V) then that component's input pins specifications may be violated. A 1-WIRE interface provides voltage bias with a pull-up resistor coupled to a supply rail. This may park the interface at an "idle" voltage when no connection is made. Unless the connected peripheral component has power applied to its Vcc pins, this would violate the component specifications as described above. The NVME_PRES_N signals include pull-ups to provide an un-asserted voltage when there is no power connection. The 1-WIRE interface may be used to detect whether the attached peripheral component is powered or not. If nothing is connected, then the weak pull-up on the wire results in a logical "high" at the CPLD. A persistent high signal indicates that there is no peripheral component connected. If the peripheral component is attached and powered, then the reception of a payload from the peripheral component will indicate that the device is powered and functioning. If a logical "low" is detected at the 1-WIRE interface, this indicates one of two possible connection states. In one state, the 1-WIRE interface is intentionally tied to ground. One example is backplanes that tie the 1-WIRE to ground because the payload is communicated along an alternate path. Another example is that of a cabled peripheral that uses more than one cable connection will ground the secondary 1-WIRE interface because the payload will be communicated on the primary 1-WIRE interface. An unpowered peripheral component attached to the system will pull the 1-WIRE voltage to a logical "low" through a "strong" pull-up and bleed resistor to ground that overcome the "weak" pull-up on the wire.

The BMC parses global status bits to determine which 1-WIRE interfaces have a status indicating a ground connection. In some embodiments, if any cabled connections are not accounted for in any payload then the information handling system may be prevented from powering on because an unpowered peripheral component is attached without its corresponding power connection. If the BMC does not detect an unpowered peripheral component then the BMC may set a bit on the SPIX interface indicating the system is ready to power on. If the BMC detects an unpowered peripheral component, no write to the CPLD may be performed when the default CPLD state is to block powering-on unless explicitly allowed by the BMC. The BMC may operate in an auxiliary power domain, separate from the power supply of the peripheral components, such that the BMC can be powered on before the information handling system turns on.

The CPLD may be configured to perform functions in response to BMC-triggered events or other events. For example, the CPLD may default to disabling clocks and holding sideband signals (e.g., PERST_N, 1-WIRE, NVME_PRES) low. When the BMC sets certain bits on the SPIX interface to enable specific ports at a next state transition, the CPLD may: unblock PERST_N, 1-WIRE, and NVME_PRES from being forced low; enable specific clocks through the I2C bus; holds off assertion of a system power good signal (e.g., SYTEMS_PWRGOOD) until I2C transactions are complete; and/or apply a high impedance to the I2C bus to allow the BIOS to interact with the clock generation circuitry during POST. The CPLD holds PERST_N asserted low to endpoints without power. The CPLD may hold the 1-WIRE low to peripheral components without power.

The techniques described above provide for protection for peripheral components with limited or no protection circuitry on the peripheral component. The safety specifications for those peripheral components are not exceeded by using circuitry on the baseboard (e.g., a BMC and CPLD) to monitor the status of peripheral components and only allow communication with the peripheral components (or only allow power-on of the information handling system) when the peripheral components are powered-on and ready to receive communication signals.

The schematic flow chart diagram of FIG. 2A and FIG. 2B is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although CPLDs are described throughout the detailed description, aspects of the invention may be implemented on different kinds of logic devices, such as graphics processing units (GPUs), central processing units (CPUs), and digital signal processors (DSPs). As another example, although processing of certain kinds of data may be described in example embodiments, other kinds or types of data may be processed through the methods and devices described above. Further, although ones ($1s$) and zeros ($0s$) or highs and lows are given as example bit values throughout the description, the function of ones and zeros may be reversed without change in operation of the processor described in embodiments above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
preventing, by a baseboard of an information handling system configured to be connected to a plurality of peripheral components in parallel, powering on of the information handling system until a determination is made, by the baseboard, that a bias voltage exists on at least one wire of a data connector connecting the information handling system to a peripheral component;
determining, by the baseboard of the information handling system that a bias voltage exists on the at least one wire of the data connector connecting the information handling system to the peripheral component;
enabling, by the information handling system, the peripheral component by activating the data connector when the bias voltage exists on at least one wire of the data connector and allowing the information handling system to power on.

2. The method of claim 1, wherein the peripheral component is powered from a power supply from a different source than the data connector.

3. The method of claim 1, wherein the step of determining that the bias voltage exists comprises:
applying a weak pull-down to the at least one wire; and
determining when a strong pull-up is applied to the at least one wire to override the weak pull-down.

4. The method of claim 3, wherein the step of enabling the peripheral component comprises turning on a clock source for the peripheral component to supply a clock signal through the data connector.

5. The method of claim 1, further comprising determining a configuration of the information handling system, the configuration comprising a listing of a plurality of peripheral components comprising the peripheral component connected to the data connector, and wherein the step of enabling the peripheral component comprises enabling a group of peripheral components that are at least a part of the plurality of peripheral components of the configuration, wherein each of the group of peripheral components being enabled share the data connector.

6. The method of claim 1, wherein preventing powering on of the information handling system comprises preventing completion of a power-on self-test (POST) routine.

7. An apparatus, comprising:
a controller of a baseboard of an information handling system configured to be connected to a plurality of peripheral components in parallel and to perform steps comprising:
preventing powering on of the information handling system until a determination is made, by the controller of the baseboard, that a bias voltage exists on at least one wire of a data connector connecting the information handling system to a peripheral component
determining that a bias voltage exists on the at least one wire of the data connector connecting the information handling system to the peripheral component;
enabling the peripheral component by activating the data connector when the bias voltage exists on at least one wire of the data connector and allowing the information handling system to power on.

8. The apparatus of claim 7, wherein the peripheral component is powered from a power supply from a different source than the data connector.

9. The apparatus of claim 7, wherein the step of determining that the bias voltage exists comprises:
applying a weak pull-down to the at least one wire; and
determining when a strong pull-up is applied to the at least one wire to override the weak pull-down.

10. The apparatus of claim 9, wherein the step of enabling the peripheral component comprises turning on a clock source for the peripheral component to supply a clock signal through the data connector.

11. The apparatus of claim 7, wherein the controller is further configured to perform the step of determining a configuration of the information handling system, the configuration comprising a listing of a plurality of peripheral components comprising the peripheral component connected to the data connector, and wherein the step of enabling the peripheral component comprises enabling a group of peripheral components that are at least a part of the plurality of peripheral components of the configuration, wherein each of the group of peripheral components being enabled share the data connector.

12. The apparatus of claim 7, wherein preventing powering on of the information handling system comprises preventing completion of a power-on self-test (POST) routine.

13. An information handling system, comprising:
a complex programmable logic device (CPLD), of a baseboard of an information handling system configured to be coupled to a plurality of peripheral components in parallel, configured to perform steps comprising:

preventing powering on of the information handling system until a determination is made, by the CPLD of the baseboard, that a bias voltage exists on at least one wire of a data connector connecting the information handling system to a peripheral component;

determining that a bias voltage exists on the at least one wire of the data connector connecting the information handling system to the peripheral component; and enabling the peripheral component by activating the data connector when the bias voltage exists on at least one wire of the data connector and allowing the information handling system to power on.

14. The information handling system of claim 13, wherein the peripheral component is powered from a power supply from a different source than the data connector.

15. The information handling system of claim 13, wherein the step of determining that the bias voltage exists comprises:

applying a weak pull-down to the at least one wire; and determining when a strong pull-up is applied to the at least one wire to override the weak pull-down.

16. The information handling system of claim 15, wherein the step of enabling the peripheral component comprises turning on a clock source for the peripheral component to supply a clock signal through the data connector.

17. The information handling system of claim 13, further comprising a baseboard management controller (BMC) configured to perform the step of determining a configuration of the information handling system, the configuration comprising a listing of a plurality of peripheral components comprising the peripheral component connected to the data connector, and wherein the CPLD is configured to perform the step of enabling the peripheral component by enabling a group of peripheral component that are at least a part of the plurality of peripheral component of the configuration under direction of the BMC, wherein each of the group of peripheral components being enabled share the data connector.

18. The information handling system of claim 13, wherein the CPLD comprises a field-programmable gate array (FPGA).

19. The information handling system of claim 13, wherein the CPLD is configured to prevent an input voltage to the peripheral component from exceeding a supply voltage to the peripheral component.

20. The information handling system of claim 13, wherein preventing powering on of the information handling system comprises preventing completion of a power-on self-test (POST) routine.

* * * * *